United States Patent Office 2,700,102
Patented Jan. 18, 1955

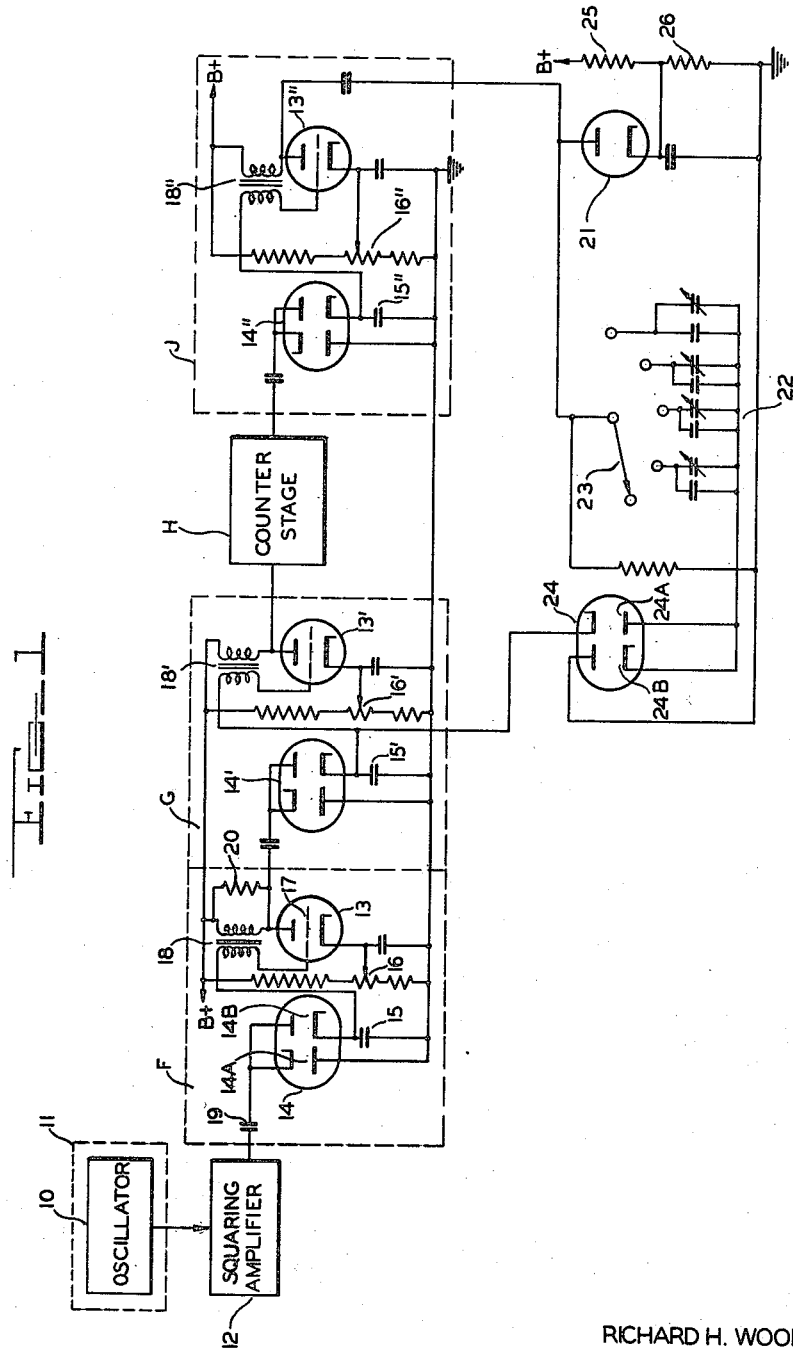

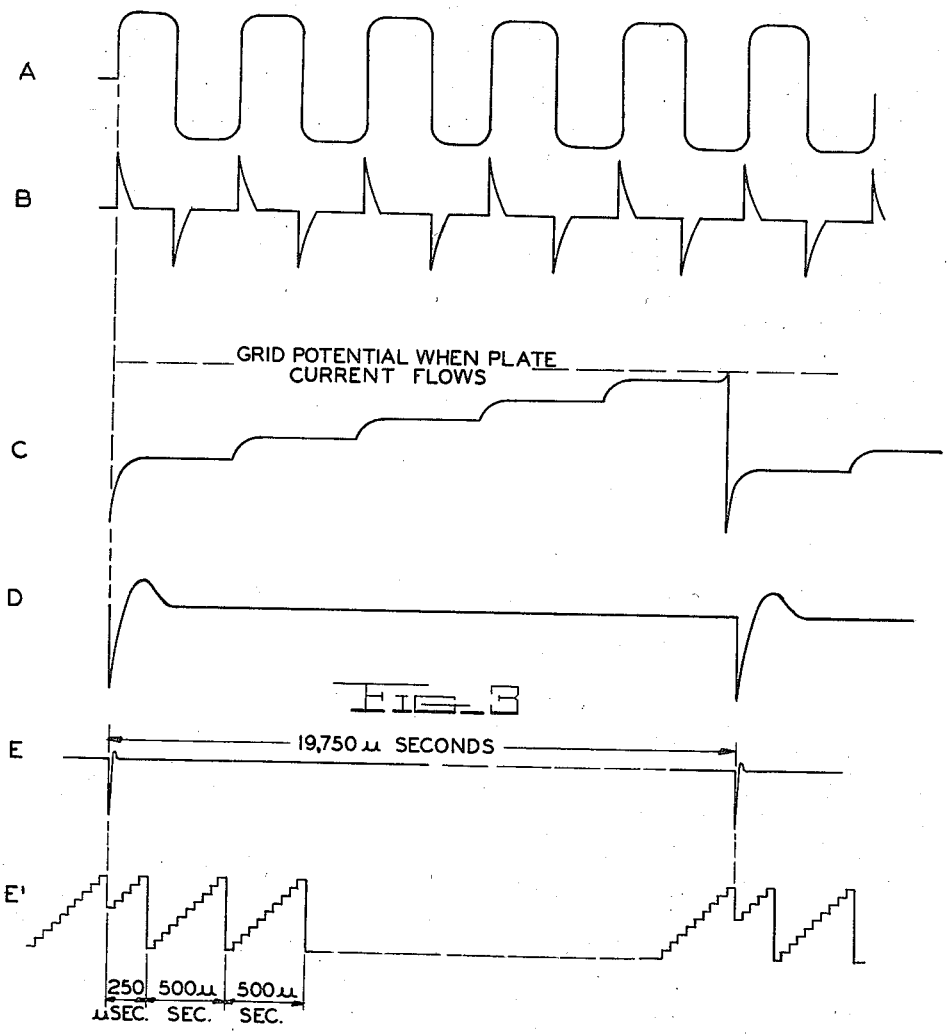

2,700,102
LONG RANGE NAVIGATION SYSTEM

Richard H. Woodward, Belmont, Mass., assignor, by mesne assignments, to the United States of America as represented by the Secretary of the Navy Application September 14, 1945, Serial No. 616,401

19 Claims. (Cl. 250—27)

This invention relates to electrical counter chains and in particular to a counter chain whose output period may be varied by subtracting multiples of the input period from the output period. The counter chain according to the present invention is particularly adaptable for use in the electronic navigating aids disclosed in the copending application of Alfred L. Loomis entitled "Long Range Navigation System" filed July 3, 1945, Serial No. 603,090, and the copending application of Jabez C. Street, John A. Pierce and Donald E. Kerr entitled "Long Range Navigation System" filed June 13, 1945, Serial No. 599,163, Patent No. 2,689,346, September 14, 1954.

It is an object of this invention to provide an electrical counter chain having a means for altering the output period thereof in a predetermined manner.

It is another object of this invention to provide an electrical counter chain whose output period is made adjustable in multiples of the input period.

Other objects and features of the invention will become apparent upon a careful consideration of the following detailed description when taken together with the accompanying drawings.

Fig. 1 is a schematic circuit diagram of a preferred embodiment of the invention; and Figs. 2 and 3 are a series of voltage time plots taken to illustrate the operation of the circuit shown in Fig. 1.

In the preferred embodiment which is shown in Fig. 1, I have illustrated a counter chain consisting of a series of pulse generators, four to be exact, which are connected in tandem by means of a like number of integrating circuits. Each pulse generator is under control of the integrating circuit which precedes it in the chain and each of the integrating circuits is in turn driven by the pulse generator which precedes it. With this arrangement, the output period of the counter chain can be varied by either small or considerable amounts simply by feeding a controllable amount of voltage output from one pulse generator back into an earlier integrating circuit. The amount the counting ratio may be varied by this method is principally dependent upon two factors; one, the amount of feedback, and two, where the feedback is introduced in the chain.

To drive the counter chain an oscillator 10 is provided, coupled through a squaring amplifier 12 to the input of the first counter stage. It is of course fundamental, that in order to maintain a stable output from the counter chain it is necessary to start with a stabilized driving source. For this reason the oscillator 10 is preferably of the crystal controlled type, tuned to say 100 kc., and has its crystal and certain other related radio frequency components disposed in a constant temperature oven, indicated in general at 11. In this way the output period of the oscillator 10 and hence the counter chain may be maintained very stable. The squaring amplifier 12 is of a known type such as a simple triode or tetrode vacuum tube, which is so biased that the sine wave output from the oscillator 10 drives it beyond both saturation and cut-off so that its plate voltage output is substantially a square wave having a fixed amplitude and frequency as shown in plot A of Fig. 2.

Before considering the operation of the counter chain itself, it should be noted that the preferred embodiment as shown in Fig. 1, is made up of a series of similarly constructed counter stages, indicated in the drawing as counters F, G, H and J. Each counter stage includes a blocking oscillator at 13 and an integrating circuit. The latter consists of a twin diode vacuum tube 14 and a voltage storage condenser 15. The grid 17 of the blocking oscillator tube at 13 is connected through the secondary winding of transformer 18 to the storage condenser 15, while the cathode is connected to the movable arm of the potentiometer 16, the resistance of which is connected between B+ and ground. By use of the potentiometer 16 the bias voltage on the cathode of the blocking oscillator may be maintained well in excess of its grid to ground voltage to thereby render it impossible for the blocking oscillator to operate except under control of the integrating circuit which precedes it in the chain.

In operation, as the 100 kc. output from the squaring amplifier 12 goes alternately positive and negative, small positive and negative pulses of current as shown in plot B of Fig. 2 pass through the charging condenser 19 to the twin diode 14. The negative current pulses pass directly to ground through the first section 14A of the twin diode 14 while the positive pulses pass through the second section 14B of the twin diode to the storage condenser 15. As the positive current pulses cannot return to ground through the cathode of diode 14B the potential on the storage condenser 15 is raised one step above ground for each positive input. By adjustment of potentiometer 16 the cathode of the blocking oscillator 13 is set to, for instance, 58 volts above ground, while the capacitor 19 and the amplitude of the output from the squaring amplifier 12 are adjusted to increase the grid potential at a rate say of 10 volts per step as shown in plot C of Fig. 2. Thus counting from a time when there was no charge on the condenser 15 the fifth step will increase the grid potential of the blocking oscillator to a value where plate current will start to flow. The plate current passes through the primary winding of the transformer 18, which is disposed in the plate circuit of the blocking oscillator 13 and has the polarity of its secondary winding arranged so that a positive rise in plate current will induce a positive rise in grid voltage which in turn increases the plate current to thus drive the tube to saturation in a very short time. Whereupon grid current will flow to thus discharge the storage condenser 15, to thereby cause plate current to cease flowing and cause the voltage across the grid winding of the transformer 18 to swing sharply negative. Resistance 20 disposed across the primary winding of the transformer 18 simply permits only a single cycle damped wave to appear there across, as shown in plot D of Fig. 2. The negative charge stored on condenser 15 by reason of grid current is immediately bled to ground through sections 14A and 14B of the twin diode 14, and the counting cycle is ready to be repeated. As may be observed from plot D of Fig. 2, the output from the blocking oscillator of the counter stage F occurs coincidentally with the fifth input thereto, so that this counter stage has a counting factor of five. The other counters G, H and J operate similarly except some are made to count down by different factors according to the setting of the potentiometer 16 disposed in their respective cathode circuits.

In the present counter chain the four serially connected counter stages F, G, H and J are arbitrarily arranged by adjustment of the cathode bias potentiometers 16, 16' and etc. to divide down by 5, 10, 5, and 8 respectively. In the same order the time separating the output pulses from the respective blocking oscillators when the chain is driven by a 100 kc. source, is 50 microseconds, 500 microseconds, 2,500 microseconds and 20,000 microseconds respectively, which corresponds to pulse repetition rates of 20,000, 2,000, 400 and 50 cycles per second. It is thus seen that 400 output pulses from the counter F are required to produce one output pulse from the counter J, which, since counter G is adjusted to count down by a factor of ten, is equivalent to putting 40 flights of voltage steps of 10 steps each on the storage condenser 15' of counter G. Therefore, if a portion of the energy output from the last counter J is fed back onto the voltage storage condenser 15' of the counter G integrating circuit, then the number of voltage steps that counter F has to provide in the first flight can be reduced to some number below ten; while the number of steps needed to be provided in each of the next 39 flights will remain unchanged, i. e. ten each. This is one way in which the frequency output of the counter chain can be altered by small amounts. It will be understood that other points of feedback can be adopted to produce similar or widely different variations in output frequency of the chain. For example, the feedback circuit could be introduced between the output of any of the blocking oscillators and any earlier integrating circuit including the integrator that drives the blocking oscillator from whence the feedback pulse is obtained.

One form of feedback circuit is shown in the lower part of the figure consisting of a diode voltage limiter 21, a plurality of charging condensers, indicated in general at 22, a frequency selector switch 23 and a twin diode 24. The voltage limiter diode 21 has its cathode connected to the juncture of a pair of serially connected resistances 25 and 26, which are connected between B+ and ground, and its plate connected in shunt to the output of the final counter stage J. In this way, the positive inputs to the feedback circuit are clipped, that is, the part of the output pulse from the final blocking oscillator in excess of the bias on the cathode of the diode limiter 21 causes the diode to conduct and is therefore shorted to ground, the remaining portion of the output pulse from the final blocking oscillator is then applied through switch 23 to one of the charging condensers 22.

The charging condensers 22 and the twin diode 24 function exactly as condenser 19 and twin diode 14 do in the first counter stage F, that is, the negative part of the feedback pulse is short circuited to ground through the second section 24B of the twin diode, while the clipped positive output from the final blocking oscillator is differentiated by one of the condensers 22 and applied through the first section 24A of the diode to the storage condenser 15' of the counter G. The effect of the feedback pulse in reducing the number of steps in the first flight appearing on condenser 15' and which have to be provided by the output from counter F is, of course, dependent upon the amplitude of the differentiated feedback pulse which in turn is governed by the size of the charging condenser 22 which couples the feedback pulse to the diode 24. Thus by careful adjustment of the charging condensers 22, the feedback pulse from one position to the next of the frequency selector switch 23 may be made to raise the voltage on the counter G storage condenser 15' by a desirable amount and manner. For instance, in the first position of the selector switch the feedback pulse may be made to provide a charge on condenser 15', equivalent to one step; in which case the period between output pulses from the final blocking oscillator will be shifted a total of 50 microseconds, since the time interval separating the occurrence of the output pulse from the first counter stage F, which is normally responsible for providing these steps is 50 microseconds. In other words, the time interval separating the occurrence of the output pulses from the final counter stage J has been changed from 20,000 microseconds at zero feedback to 19,950 microseconds in the first position of feedback which is equivalent to a frequency shift of 50 to approximately 50⅛ cycles per second. Therefore in the arrangement described, the feedback condensers 22 may be organized in such a manner that each new position of the selector switch 23 will shift the output period 50 microseconds. Other fractional or integral amounts of period shift may be obtained simply by changing the size of the condensers 22 and/or the points between which feedback is introduced.

In Fig. 3 the output of the final counter J is represented by curve E. The amount of feedback has been chosen to raise the voltage on condenser 15' of counter G by an amount corresponding to five steps as shown by curve E'. Since each step of the integrating circuit in counter G in the instant embodiment has a duration of 50 microseconds, the elapsed time until the blocking oscillator at 13' is triggered will be reduced from 500 to 250 microseconds. This reduces the period of the final counter J from 20,000 to 19,750 microseconds. For simplicity the spikes in Fig. 2C have been omitted.

An application of this invention is made in the long range navigational system disclosed in the above-identified applications. In this system it is necessary to operate several pairs of pulse transmitting stations at the same radio frequency, and the pulses from the several pairs appear on the cathode ray trace of the navigator's receiver-indicator. In order that each pair of stations may be distinguished, the pulses emitted from each pair must have a slightly different pulse recurrence rate from the other pairs. This invention is utilized in the transmitting stations to establish the pulse recurrence rate of each pair, and in the receiver-indicator to adjust the sweep recurrence rate corresponding to the recurrence rate of the pair of stations whose signals it is desired to receive. When the sweep rate is so adjusted the pulses from the desired pair will remain stationary on the trace, while pulses from other pairs and of a different recurrence rate will be seen to drift along the trace either to the right or to the left.

Although I have shown and described only one embodiment of the invention and one application thereof, it must be understood that many changes may be made in both without departing from the spirit of the invention. Therefore this invention is not to be limited except insofar as is necessitated by the prior art and the spirit of the appended claims.

I claim:

1. An electrical counter chain comprising a plurality of blocking oscillators, a similar number of voltage integrating circuits each of which develops an output voltage which increases approximately in direct proportion to the number of input pulses applied thereto, means joining in series and in an alternate manner first an integrating circuit and then a blocking oscillator and so on, means for biasing each of said blocking oscillators so as to operate only when the voltage level of the integrating circuit which precedes it in the chain has attained a predetermined value, and means for feeding back a controllable amount of the voltage output pulse into an intermediate integrating circuit from a subsequent pulse generator in said chain so as to alter the counting factor of said chain.

2. An electrical counter chain comprising a plurality of voltage pulse generators, a similar number of voltage integrating circuits each of which develops an output voltage which increases in direct proportion to the number of input pulses applied thereto, means joining in series and in an alternate manner first an integrating circuit and then a pulse generator and so on, means for causing each of said pulse generators to operate whenever the voltage level of the integrating circuit which precedes it in the chain attains a predetermined value, means responsive to the operation of each of said pulse generators for simultaneously reducing to zero the voltage level of the integrating circuit which precedes it, and means for feeding a controllable amount of the voltage output pulse from the final pulse generator of said chain back into an intermediate integrating circuit so as to alter the number of input pulses to said chain which are required to produce an output pulse therefrom.

3. An electrical counter chain comprising a plurality of blocking oscillators, a similar number of voltage integrating circuits each of which develops an output voltage which increases in direct proportion to the number of input pulses applied thereto, means joining in series and in an alternate manner first an integrating circuit and then a blocking oscillator and so on, means for biasing each of said blocking oscillators so as to operate only when the voltage level of the integrating circuit which precedes it in the chain has attained a predetermined value, means responsive to the operation of each of said blocking oscillators for simultaneously reducing to zero the voltage level of the integrating circuit which precedes it, and means for feeding a controllable amount of the voltage output pulse from the final blocking oscillator in said chain back into an intermediate integrating circuit so as to alter the counting factor of said chain.

4. An electrical counter chain comprising a plurality of blocking oscillators, a similar number of voltage integrating circuits each of which develops an output voltage which increases in direct proportion to the number of input pulses applied thereto, means joining in series and in an alternate manner first an integrating circuit and then a blocking oscillator and so on, means for biasing each of said blocking oscillators so as to operate only when the voltage level of the integrating circuit which precedes it in the chain has attained a predetermined value, means responsive to the operation of each of said blocking oscillators for simultaneously reducing to zero the voltage level of the integrating circuit which precedes it, and means for feeding a controllable amount of the voltage output pulse from the final blocking oscillator of said chain back into an intermediate integrating circuit so as to alter the counting factor of said chain, said last named means consisting of a voltage limiting diode for limiting the size of feedback pulse, means for differentiating said feedback pulse, and means for controlling the amplitude of said differentiated feedback pulse.

5. An electrical counter chain comprising a plurality of blocking oscillators, a similar number of voltage integrating circuits each of which develops an output voltage which increases in direct proportion to the number of input pulses applied thereto, means joining in series and in an alternate manner first an integrating circuit and then a blocking oscillator and so on, means for biasing each of said blocking oscillators so as to operate only when the voltage level of the integrating circuit which precedes it in the chain has attained a predetermined value, means responsive to the operation of each of said blocking oscillators for simultaneously reducing to zero the voltage level of the integrating circuit which precedes it, and means for feeding a controllable amount of the voltage output pulse from the final blocking oscillator of said chain back into an intermediate integrating circuit so as to alter the counting factor of said chain, said last named means consisting of a voltage limiting diode for limiting the amplitude of said feedback pulse, means for differentiating said feedback pulse, and means shorting to ground the undesired portion of said differentiated feedback pulses.

6. An electrical frequency divider system comprising a plurality of serially connected frequency dividing circuits, each of which is adapted to respond to an input pulse signal having a first period to provide an output pulse signal having a period that is a multiple of said first period and controllable feedback means coupled between two of said frequency dividing circuits for adjusting the output pulse period of one of said two frequency dividing circuits in multiples of the input pulse period of the other of said two frequency dividing circuits.

7. An electrical counter chain comprising, a plurality of frequency dividing circuits each comprising a voltage pulse generator and a voltage integrating circuit, means joining in series and in an alternate manner first an integrating circuit and then a pulse generator, and so on, each of said integrating circuits comprising, a charging capacitor and a storage capacitor, each of said capacitors having first and second plates, a unilateral conductive device connected between the first plates of said charging and storage capacitors for admitting current from said charging capacitor to said storage capacitor and a second unilateral conductive device connected between the first plate of said charging capacitor and the second plate of said storage capacitor for discharging said charging capacitor, means for coupling applied pulses between the second plates of the storage and charging capacitors of the first integrating circuit, each of said pulse generators being coupled across the storage capacitor of the preceding integrating circuit and being operative to produce an output pulse when the voltage level of said storage capacitor of said preceding integrating circuit attains a predetermined value, the storage capacitor of each integrating circuit discharging through the following pulse generator upon production of said output pulse to simultaneously reduce the voltage level of said storage capacitor to zero, the output of each pulse generator, save the last, being coupled between the second plates of the charging and storage capacitors of the following integrating circuit, and feedback means coupling the output of the last pulse generator back into an intermediate integrating circuit, said feedback means comprising, a charging capacitor having first and second plates, a unilateral conductive device connected between the first plate of said last-mentioned charging capacitor and the first plate of the storage capacitor of said intermediate integrating circuit for admitting current from said last-mentioned charging capacitor to said storage capacitor of said intermediate integrating circuit, and a second unilateral conductive device connected between the first plate of said last-mentioned charging capacitor and the second plate of said storage capacitor of said intermediate integrating circuit for discharging said last-mentioned charging capacitor, the output of said last pulse generator being coupled between the second plate of the charging capacitor of said feedback means and the second plate of the storage capacitor of said intermediate integrating circuit.

8. An electrical counter chain comprising, a plurality of blocking oscillators, a similar number of voltage integrating circuits, means joining in series and in an alternate manner first an integrating circuit and then a blocking oscillator, and so on, each of said integrating circuits comprising, a charging capacitor and a storage capacitor, each of said capacitors having first and second plates, a unilateral conductive device connected between the first plates of said charging and storage capacitors for admitting current from said charging capacitor to said storage capacitor and a second unilateral conductive device connected between the first plate of said charging capacitor and the second plate of said storage capacitor for discharging said charging capacitor, means for coupling applied pulses between the second plates of the storage and charging capacitors of the first integrating circuit, each of said blocking oscillators being coupled across the storage capacitor of the preceding integrating circuit, each of said integrating circuits developing an output voltage across its storage capacitor in direct proportion to the number of pulses applied between the second plates of its charging and storage capacitors, each of said blocking oscillators being operative to produce an output pulse in response to the attainment across the storage capacitor of the preceding integrating circuit of a predetermined voltage, means for biasing each of said blocking oscillators by a controllable degree to select the voltage across the storage capacitor of the preceding integrating circuit at which said blocking oscillator will be rendered operative, the storage capacitor of each integrating circuit discharging through the following blocking oscillator, upon the production of a pulse by said blocking oscillator, to simultaneously reduce to zero the voltage across said storage capacitor, the output of each blocking oscillator, save the last, being coupled between the second plates of the charging and storage capacitors of the following integrating circuit, and feedback means coupling the output of the final blocking oscillator back to an intermediate integrating circuit, said feedback means comprising, means, including a voltage limiting diode, coupled to said final blocking oscillator for limiting the amplitude of the output pulses of said final blocking oscillator to a predetermined amplitude, a charging capacitor having first and second plates, a unilateral conductive device connected between the first plate of said last-mentioned charging capacitor and the first plate of the storage capacitor of said intermediate integrating circuit for admitting current from said last-mentioned charging capacitor to said storage capacitor of said intermediate integrating circuit, and a second unilateral conductive device connected between said first plate of said last-mentioned charging capacitor and the second plate of said storage capacitor of said intermediate integrating circuit for discharging said last-mentioned charging capacitor, said limited amplitude pulses of said final blocking oscillator being coupled between the second plate of said last-mentioned charging capacitor and the second plate of said storage capacitor of said intermediate integrating circuit, said last-mentioned charging capacitor having its capacitance controllable in steps to control by steps the magnitude of the voltage generated at said storage capacitor of said intermediate integrating circuit by virtue of said feedback means to thereby control by steps the number of pulses required at the output of the blocking oscillator preceding said intermediate integrating circuit to raise the voltage across the storage capacitor of said intermediate integrating circuit to a value sufficient to actuate the blocking oscillator following said intermediate integrating circuit.

9. In combination, a source of pulses, a plurality of integrating circuits and a like plurality of pulse generating circuits connected in alternation in series beginning with a first integrating circuit, means coupling said source of pulses only to said first integrating circuit, means biasing each of said pulse generating circuits so as to produce an output pulse only when the voltage level of the integrating circuit which immediately precedes it reaches a value determined by the impression thereon of a selected number of pulses, and means coupled between one of said pulse generating circuits and a preceding integrating circuit for feeding back a controllable portion of the output voltage pulse of said one pulse generating circuit thereby to control the counting factor of the combination.

10. In combination, a source of pulses having a stable repetition frequency, a plurality of integrating circuits and a like plurality of blocking oscillator circuits connected in alternation in series beginning with a first integrating circuit, means coupling said source of pulses only to said first integrating circuit, means biasing each of said blocking oscillator circuits so as to produce an output pulse only when the voltage level of the integrating circuit which immediately precedes it reaches a predetermined value determined by the impression thereon of a selected number of pulses, and means coupled between one of said blocking oscillator circuits and a preceding integrating circuit for feeding back a controllable portion of the output voltage pulse of said one blocking oscillator circuit thereby to control the counting factor of the combination.

11. In combination, a source of pulses having a stable repetition frequency, a plurality of integrating circuits and a like plurality of blocking oscillator circuits connected in alternation in series beginning with a first integrating circuit, means coupling said source of pulses only to said first integrating circuit, means biasing each of said blocking oscillator circuits so as to produce an output pulse only when the voltage level of the integrating circuit which immediately precedes it reaches a predetermined value determined by the impression thereon of a selected number of pulses, means responsive to the operation of each of said blocking oscillators for simultaneously reducing to zero the voltage level of the integrating circuit which precedes it, and means coupled between one of said blocking oscillator circuits and a preceding integrating circuit for feeding back a controllable portion of the output voltage pulse of said one blocking oscillator circuit thereby to control the counting factor of the combination.

12. In combination, a source of pulses, a chain of serially connected frequency divider circuits each having input and output terminals and each being arranged to produce an output voltage pulse in response to the application thereto of a predetermined number of input pulses of predetermined amplitude, means coupling said source of pulses only to the first divider circuit of said chain, and means coupled between the output terminals of one of said divider circuits and the input terminals of a preceding divider circuit in said chain and arranged to controllably feed back a portion of the output pulse of said one frequency divider circuit, said portion having an amplitude which is a multiple of said predetermined amplitude thereby to control the counting factor of said chain.

13. In an electronic counting circuit, the combination which comprises, a source of pulses having a fixed repetition frequency, a chain of frequency divider circuits each having input and output terminals and each being constructed and arranged to produce an output voltage pulse of a predetermined amplitude in response to the application thereto of a selected number of input pulses of said predetermined amplitude, means coupling said source of pulses only to the input terminal of the first divider circuit of said chain, and means for altering the counting factor of said chain comprising a feedback circuit coupled between the output terminals of the final divider circuit of said chain and the input terminals of a preceding divider circuit, said feedback circuit including means for limiting the amplitude of the output pulse of said final divider circuit to a multiple of said predetermined amplitude.

14. In combination, a source of pulses, a counter chain comprising a plurality of blocking oscillators, a like plurality of voltage integrating circuits each being arranged to develop an output voltage which increases approximately in direct proportion to the number of input pulses applied thereto, means joining in series and in alternation first an integrating circuit and then a blocking oscillator, and so on, means biasing each of said blocking oscillators so as to produce an output pulse only when the voltage level of the integrating circuit which precedes it in the chain has attained a predetermined value, means coupling said source of pulses only to said first integrating circuit, and means for feeding back a controllable portion of the voltage output pulse of one of said blocking oscillators to a preceding integrating circuit thereby to alter the counting factor of said chain by a predetermined factor.

15. In combination, a source of pulses having a stable repetition frequency, a counter chain comprising a plurality of blocking oscillators, a like plurality of voltage integrating circuits each being arranged to develop an output voltage which increases in direct proportion to the number of input pulses applied thereto, means joining in series and in alternation first an integrating circuit and then a blocking oscillator, and so on, means biasing each of said blocking oscillators so as to produce an output pulse only when the voltage level of the integrating circuit which precedes it in the chain has attained a predetermined level, means responsive to the operation of each of said blocking oscillators for simultaneously reducing to zero the voltage level of the integrating circuit which precedes it, means coupling said source of pulses only to the first integrating circuit of said chain, and means for feeding a controllable portion of the voltage output pulse of one of said blocking oscillators in said chain back to a preceding integrating circuit so as to alter the counting factor of said chain.

16. An electrical frequency divider system comprising a chain of serially connected frequency divider circuits, each being arranged to respond to a recurring input pulse signal to provide a recurring output pulse signal having a period that is a multiple of said input pulse signal, and controllable feedback means coupled between two frequency dividing circuits of said chain for adjusting the output pulse period of the subsequent divider circuit of said two dividing circuits in multiples of the signal pulse period of the preceding dividing circuit of said two dividing circuits.

17. In combination, a plurality of serially connected frequency dividers, each divider having input and output circuits, a source of recurring pulses connected only to the input circuit of the first frequency divider of said series, means for independently establishing a predetermined counting factor for each frequency divider so as to determine the number of pulses that must be fed to its input circuit to produce a single pulse in its output circuit, and means for coupling the output circuit of a selected frequency divider to the input circuit of another frequency divider in said series for altering the over-all counting factor of said series.

18. In combination, a plurality of serially connected frequency dividers, each divider having input and output circuits, a source of pulses having a stable repetition frequency connected only to the input circuit of the first frequency divider of said series, means for independently regulating the counting factor of each frequency divider so as to determine the number of pulses that must be supplied to its input circuit to produce a single pulse in its output circuit, and means for coupling the output circuit of a selected frequency divider to the input circuit of a preceding frequency divider in said series whereby the over-all counting factor of said series is changed.

19. In combination, a plurality of serially connected pulse dividers, each divider having input and output circuits, a source of substantially constant amplitude pulses connected only to the input circuit of the first pulse divider of the series, means for independently establishing a predetermined counting factor for each pulse divider so as to determine the number of pulses that must be fed to its input circuit to produce a single pulse in its output circuit, and means for feeding back from the output circuit of a selected pulse divider to the input of a preceding pulse divider a pulse whose magnitude is adjustable by increments equal to the amplitude of said constant amplitude pulses whereby the over-all counting factor of the series is changed.

References Cited in the file of this patent

UNITED STATES PATENTS

| | | |
|---|---|---|
| 2,113,011 | White | Apr. 5, 1938 |
| 2,137,010 | Bedford | Nov. 15, 1938 |
| 2,277,000 | Bingley | Mar. 17, 1942 |
| 2,306,386 | Hollywood | Dec. 29, 1942 |
| 2,404,918 | Overbeck | July 30, 1946 |
| 2,410,156 | Flory | Oct. 29, 1946 |
| 2,420,516 | Bischoff | May 13, 1947 |
| 2,450,360 | Schoenfeld | Sept. 28, 1948 |
| 2,487,191 | Smith, Jr. | Nov. 8, 1949 |
| 2,537,077 | McVay et al. | Jan. 9, 1951 |

OTHER REFERENCES

Lifschutz, "New Vacuum Tube Scaling Circuits of . . . Fractional Scaling Ratio," Physical Review, vol. 57 (1940); pages 243, 244 (photo in 235–92E).

Potter, "A Four-Tube Counter Decade," Electronics, June 1944, published by McGraw-Hill Publishing Co., New York, N. Y.